United States Patent Office 3,291,812
Patented Dec. 13, 1966

3,291,812
NOVEL 3-KETO-4-FLUORO-Δ⁴-STEROIDS AND PREPARATION THEREOF
Robert Joly, Montmorency, Julien Warnant, Neuilly-sur-Seine, Armand Guillemette, Noisy-le-Sec, and Bernard Goffinet, Paris, France, assignors to Roussel-UCLAF, Paris, France, a corporation of France
No Drawing. Filed Aug. 2, 1965, Ser. No. 476,729
Claims priority, application France, Mar. 21, 1960, 822,001
22 Claims. (Cl. 260—397.3)

This application is a continuation-in-part application of our copending application Serial No. 94,980, filed March 13, 1961, now abandoned.

The invention relates to novel 3-keto-4-fluoro-Δ⁴-steroids and a process for producing the 3-keto-4-fluoro-Δ⁴-steroids with high yields. The invention also relates to novel intermediates for the 3-keto-4-fluoro-Δ⁴-steroids.

Camerino et al. (Il Farmaco, Ed. Sci., vol. 13, 1958, page 52) produced certain 4-fluoro steroids by reacting hydrofluoric acid with the corresponding 4,5-epoxy steroids. This process gives only mediocre yields of the order of 20% and has other inconveniences. The handling of hydrofluoric acid is difficult and requires special reaction vessels. Moreover, the reaction cannot be applied to many steroids, where the direct preparation of the 4,5-epoxide group is not possible because of the presence of other easily oxidizable functions in the molecule. This is particularly true for steroids having double bonds in positions other than the Δ⁴-position such as the Δ⁹⁽¹¹⁾-position.

It is an object of the invention to provide novel 3-keto-4-fluoro-Δ⁴-steroids.

It is another object of the invention to provide a novel method of producing 3-keto-4-fluoro-Δ⁴-steroids in high yields.

It is a further object of the invention to provide novel intermediates for the preparation of 3-keto-4-fluoro-Δ⁴-steroids.

These and other objects and advantages of the invention will become obvious from the following detailed description.

The process of the invention comprises reacting a 3-keto-Δ⁴-steroid with a secondary amine in the presence of a lower alkanol to form the corresponding 3-enamino-Δ³,⁵-steroid, reacting the latter with perchlorylfluoride in an aqueous polar solvent to form the corresponding 3-keto-4-fluoro-Δ⁵-steroid, isomerizing the said product under acid conditions to form the corresponding 3-keto-4-fluoro-Δ⁴-steroid and recovering the latter.

The secondary amine used to form the 3-enamino-steroid may be a di-lower alkyl amine or a cyclic amine such as pyrrolidine, piperidine, morpholine, etc. The use of pyrrolidine is particularly advantageous.

The reaction of the enamines with perchloryl-fluoride is carried out in an aqueous polar solvent. Aqueous solutions of di-lower alkyl amides of lower alkanoic acids or lower alkanols are suitable solvents. The preferred solvents are aqueous dimethylformamide, pyridine and methanol. The reaction is carried out at low temperatures below −15° C., preferably of the order of −15° to −30° C. because the reaction is strongly exothermic.

The isomerization of the Δ⁵-position to the Δ⁴-position may be carried out in the presence of a strong organic or mineral acid at room temperatures. A preferred acid is hydrochloric acid. The reaction takes place in the presence of an inert organic solvent such as di-lower alkyl amides of lower alkanoic acids and especially dimethylformamide.

A preferred process of the invention comprises reacting pyrrolidine with a 3-keto-Δ⁴-steroid in the presence of methanol to form the corresponding 3-(N-pyrrolidyl)-Δ³,⁵-steroid, reacting the latter with perchlorylfluoride at low temperatures below −15° C. in aqueous dimethylformamide to form the corresponding 3-keto-4-fluoro-Δ⁵-steroid, isomerizing the said product in the presence of a strong mineral acid to form the corresponding 3-keto-4-fluoro-Δ⁴-steroid and recovering the latter. The reaction is illustrated by the following reaction scheme:

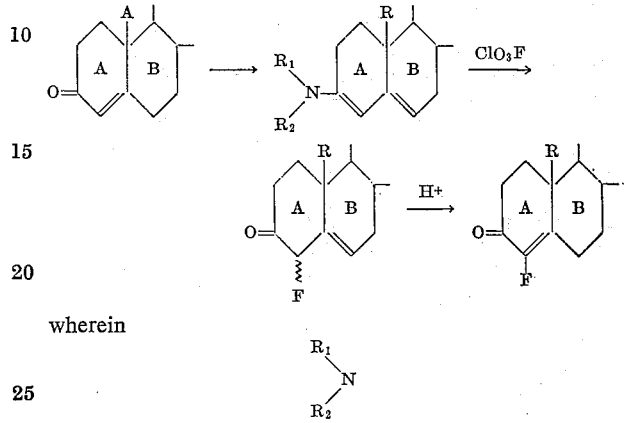

wherein $$R_1 \diagdown N \diagup R_2$$

is selected from the group consisting of dilower alkyl amino, pyrrolidyl, piperidino and morpholino and R is a hydrogen or methyl group. The remainder of the steroid molecule is not indicated.

The starting 3-keto-Δ⁴-steroids are derived from spirostane, furostane, cholestane, cholane, pregnane and androstane. They may be substituted in the C and D rings and the lateral chain by lower alkyl radicals such as methyl or ethyl radicals or alkynyl radicals, with hydroxy groups, alkoxy groups, acyloxy groups, halogens such as fluorine, bromine or chlorine, keto groups, ketal groups, esterified carboxy groups and other double bonds. Examples of suitable starting materials are testosterone, 17α-ethynyl-testosterone, 17α-methyl-testosterone, progesterone, 16α-methyl-progesterone, cortisone, hydrocortisone, 16α-methyl-cortisone, 16α-methyl-hydrocortisone, or intermediates for said starting materials such as 16α-methyl-Δ⁴,⁹⁽¹¹⁾-pregnadiene-17α-ol-3,20-dione.

The 3-keto-4-fluoro-Δ⁴-steroids of the invention are valuable intermediates for the preparation of other steroids. They can be dehydrogenated by chemical or microbiological means to form the corresponding Δ¹-dehydro-steroids.

In the following examples there are described several preferred embodiments to illustrate the invention. However, it should be understood that the invention is not intended to be limited to the specific embodiments.

EXAMPLE I.—PREPARATION OF 4-FLUORO-16α-METHYL - Δ⁴,⁹⁽¹¹⁾ - PREGNADIENE-17α-OL-3,20-DIONE AND ITS ACETATE

Step A.—3 - (N-pyrrolidyl)-16α-methyl-Δ³,⁵,⁹⁽¹¹⁾-pregnatriene-17α-ol-20-one. 5 gm. of 16α - methyl-Δ⁴,⁹⁽¹¹⁾-pregnadiene-17α-ol-3,20-dione prepared according to Belgian Patent No. 579,900 were introduced into 45 cc. of methanol and the reaction mixture was heated to reflux under agitation and an atmosphere of nitrogen. Then 4.5 cc. of pyrrolidine were added dropwise. After refluxing for 5 minutes, the mixture was cooled and allowed to stand for ½ hour. The precipitate, 3-(N-pyrrolidyl)-16α - methyl - Δ³,⁵,⁹⁽¹¹⁾-pregnatriene-17α-ol-20-one, was vacuum filtered and washed with methanol and isopropyl ether.

The yield was 5.100 gm. (being 89% of the theoretical) of the product which had a melting point of 204° C. and a specific rotation $[\alpha]_D^{20} = -212°$ (c.= 0.5% in dioxane). The product, which was in the form of pale yellow hexagonal crystals, was soluble in acetone, benzene and chloroform, very slightly soluble in alcohol and ether and slightly soluble in water. It decomposed in dilute aqueous acids and alkalis.

*Analysis.*—$C_{26}H_{37}O_2N$, molecular weight=395. Calculated: C, 78.94%; H, 9.43%; N, 3.54%. Found: C, 79.2%; H, 9.5%; N, 3.8%.

This compound is not described in the literature.

*Step B.*—4 - fluoro - 16α-methyl-$\Delta^{5,9(11)}$-pregnadiene-17α-ol-3,20-dione. 0.2 gm. of the enamine produced in Step A was placed in suspension in 2 cc. of dimethylformamide containing 10% water. The reaction mixture was cooled to −15° to −20° C. and perchlorylfluoride was bubbled through the suspension. A true solution formed followed immediately by a crystallization. After abundant crystallization, the flow of perchlorylfluoride was stopped. The excess of this reactant was removed by a current of nitrogen and when the temperature rose to room temperature, 8 cc. of water were added. The reaction mixture was allowed to stand for several minutes before being vacuum filtered. The precipitate was washed with water and dried in order to recover 0.15 gm. (being 82% of the theoretical) of raw 4-fluoro-16α - methyl-$\Delta^{5,9(11)}$-pregnadiene-17α-ol-3,20-dione having a melting point of 198° C. It was purified by dissolution in dimethylformamide, treatment with animal charcoal, precipitation and washing with water. The yield on purification was 85%. The product obtained, melting at 208 to 209° C. and having a specific rotation $[\alpha]_D^{20}=+31°$ (c.=0.5% in dioxane), was present in the form of colorless crystals soluble in cold dimethylformamide and in hot benzene and chloroform. It was slightly soluble in alcohol and acetone and insoluble in water and dilute aqueous acids and alkalis.

*Analysis.*—$C_{22}H_{29}O_3F$, molecular weight=360.45. Calculated: C, 73.3%; H, 8.1%; F, 5.27%. Found: C, 73.6%; H, 8.1%; F, 5.0%.

Ultraviolet spectra: inflection towards 250 m$\mu$, $\epsilon$=300 and at 290 m$\mu$, $\epsilon$=147.

This product is not described in the literature.

*Step C.*—4-fluoro-16α-methyl-$\Delta^{4,9(11)}$-pregnadiene-17α-ol-3,20-dione. 1 gm. of the raw compound produced in Step B melting at 198° C. was dissolved in 10 cc. of dimethylformamide and 1 cc. of concentrated hydrochloric acid was added. The product slowly crystallized. The reaction mixture was allowed to remain for 20 hours at room temperature and then an equal volume of water was added thereto. The precipitate was vacuum filtered, washed with water and dried to recover 0.93 gm. (a yield of 93%) of 4-fluoro-16α-methyl-$\Delta^{4,9(11)}$-pregnadiene-17α-ol-3,20-dione, melting at 203° C. The product was purified by recrystallization from methanol with a yield of about 90% and had a melting point of 205° C. and a specific rotation $[\alpha]_D^{20}=+71°$ (c.=0.5% in dioxane). The product was soluble in hot dimethylformamide, less in methanol, very slightly soluble in cold alcohol and insoluble in ether, water and dilute aqueous acids and alkalis.

*Analysis.*—$C_{22}H_{29}O_3F$, molecular weight=360.45. Calculated: C, 73.3%; H, 8.1%; F, 5.27%. Found: C, 73.4%; H, 8.0%; F, 5.4%.

Ultraviolet spectra: $\lambda_{max}$ 247 m$\mu$, $\epsilon$=15.900.

Infrared spectra: strong band and asymmetric maximum at 1685 cm.$^{-1}$ $\epsilon$=1,000.

This product is not described in the literature.

The esterification of 4 - fluoro - 16α-methyl-$\Delta^{4,9(11)}$-pregnadiene-17α-ol-3,20-dione by acetic anhydride in the presence of p-toluene sulfonic acid gave 4-fluoro-17α-acetoxy-16α-methyl-$\Delta^{4,9(11)}$-pregnadiene-3,20 - dione with a melting point of 184° C. and a specific rotation $$[\alpha]_D^{20}=+60°\pm1°$$

(c.=0.5% in dioxane).

Ultraviolet spectra: $\lambda_{max}$ (ethanol) 247 m$\mu$, $\epsilon$=15,600. The product was soluble in acetone, benzene and chloroform, soluble in hot alcohol, insoluble in water and ether.

*Analysis.*—$C_{24}H_{31}O_4F$, molecular weight=402.49. Calculated: C, 71.61%; H, 7.76%; F, 4.72%. Found: C, 71.6%; H, 7.6%; F, 4.7%.

This compound is not described in the literature.

EXAMPLE II.—PREPARATION OF 4-FLUORO-PROGESTERONE 3-(N-pyrrolidyl)-$\Delta^{3,5}$-pregnadiene-20 - one was prepared by the procedure of Step A in Example I from $\Delta^4$-pregnene-3,20-dione and the product obtained had a melting point of 187° to 194° C. The compound is further described by Heyl et al., J. Am. Chem. Soc., 75, 1918 (1953). The yield of this step was 96%.

10 gm. of the said 3-(N-pyrrolidyl)-steroid were subjected to a treatment by perchlorylfluoride identical to that described in Step B of Example I and 4-fluoro-$\Delta^5$-pregnene-3,20-dione was obtained, having a melting point of 202° C., and a specific rotation $[\alpha]_D^{20}=+21.7°$ (c.=0.5% in dioxane). The product had the form of white, star-shaped crystals and was soluble in benzene and in hot methanol, slightly soluble in ethyl alcohol, ether, acetone, water and the dilute aqueous acids and alkalis.

*Analysis.*—$C_{21}H_{29}O_2F$, molecular weight=332.4. Calculated: C, 75.86%; H, 8.79%; F, 5.71%. Found: C, 75.9%; H, 8.6%; F, 5.4–5.5%.

This compound is not described in the literature.

4-fluoro-$\Delta^5$-pregnene-3,20 - dione was isomerized with hydrochloric acid in dimethylformamide by the mode of operation described in Step C of Example I and 4-fluoro-progesterone was obtained with a yield of 75% and having a melting point of 187° C. and a specific rotation $[\alpha]_D^{20}=+154.5°$ (c.=0.5% in dioxane).

EXAMPLE III.—PREPARATION OF 4-FLUORO-TESTOSTERONE

By following the procedure of Example I, the following products were obtained when starting with testosterone.

*Step A.*—3 - (N - pyrrolidyl)-$\Delta^{3,5}$-androstadiene-17β-ol having a melting point of 147° C. then 162 to 163° C., and a specific rotation $[\alpha]_D^{20}=-170°$ (c.=0.5% in dioxane). The compound is described by Heyl et al., J. Am. Chem. Soc., 75, 1918 (1953). The yield of this step was 98%.

*Step B.*—4-fluoro-$\Delta^5$-androstene-17β-ol-3-one having a melting point of 192° C. and a specific rotation $[\alpha]_D^{20}=-54.5°$ (c.=0.5% in dioxane). The yield of this step was 83.5%. The product had the form of white, prismatic crystals and was soluble in acetone, slightly soluble in alcohol, ether, benzene, chloroform, water and dilute aqueous acids or alkalis.

This product is not described in the literature.

*Step C.*—4-fluoro-testosterone having a melting point of 172 to 173° C. and a specific rotation $[\alpha]_D^{20}=+85°$ (c.=0.5% in dioxane). This yield was 80%.

*Analysis.*—$C_{19}H_{27}O_2F$, molecular weight=306.4. Calculated: C, 74.47%; H, 8.88%; F, 6.2%. Found: C, 74.2%; H, 8.5%; F, 6.1%.

Ultraviolet spectra: $\lambda_{max}$ 248 m$\mu$, $\epsilon$=14,800.

This product is not described in the literature.

EXAMPLE IV.—PREPARATION OF 4-FLUORO-17α-HYDROXY-PROGESTERONE

*Step A.*—Preparation of 3-pyrrolidyl-enamine of 17α-hydroxy-progesterone. 10 gm. of $\Delta^4$-pregnene-17α-ol-3,20-dione were introduced into 70 cc. of methanol and the reaction mixture was heated to reflux under agitation and in an atmosphere of nitrogen. Then, to the reaction mixture under reflux was added a mixture of 10 cc. of methanol and 10 cc. of pyrrolidine. After several minutes of refluxing, the reaction mixture was cooled and allowed to stand for a period of several minutes at a temperature between 0° and 5° C. 3-(N-pyrrolidyl)-enamine of 17α-hydroxy-progesterone was formed and vacuum filtered. The raw product was purified by trituration with methanol. 10.095 gm. of the product were obtained having a melting point of 193° C. and a specific rotation $[\alpha]_D^{20} = -111.1° \pm 1°$ (c.=0.5% in dioxane), nitrogen percent=3.8 to 3.7.

The product was soluble in benzene, chloroform, dioxane, methylene chloride, insoluble in water, alcohol, ether, acetone, methanol and dilute aqueous acids and alkalis.

The compound is not described in the literature.

The starting compound was prepared according to the method described by Gallagher, J. Am. Chem. Soc., 73, 184 (1951).

*Step B.*—Preparation of 4-fluoro-Δ⁵-pregnene-17α-ol-3,20-dione. 8 gm. of the 3-pyrrolidyl-enamine of progesterone-17α-ol were introduced into 80 cc. of methanol containing 10% of water. The reaction mixture was cooled to −25° C. and perchlorylfluoride was made to bubble therethrough. A total dissolution was produced followed at the end of the absorption by a crystallization. When the crystallization became abundant, the bubbling of perchlorylfluoride was stopped and the excess of this reactant was removed by a current of nitrogen and 80 cc. of demineralized water were added thereto. The precipitate was vacuum filtered, washed with water and dried. 6.565 gm. of 4-fluoro-Δ⁵-pregnene-17α-ol-3,20-dione were recovered.

The raw product was purified by crystallization from methanol and recrystallization from benzene. The product obtained had a melting point of 241° C. and a specific rotation $[\alpha]_D^{20} = -62.3° \pm 1.5°$ (c.=0.5% in chloroform) and a fluorine content of 5.4%. It was slightly soluble in acetone, benzene, chloroform, methylene chloride and methanol, insoluble in water, alcohol and ether.

*Analysis.*—$C_{21}H_{29}O_3F$, molecular weight=348.44. Calculated: C, 72.38%; H, 8.38%; F, 5.45%. Found: C, 72.3%; H, 8.3%; F, 5.4%.

This compound is not described in the literature.

*Step C.*—Preparation of 4-fluoro-17α-hydroxy-progesterone. 700 mg. of raw compound produced in Step B were dissolved in 7 cc. of dimethylformamide and 0.7 cc. of concentrated hydrochloric acid was added. The reaction mixture was allowed to stand for a period of 15 hours at room temperature. Then 7 cc. of water were added thereto and the product precipitated. The precipitate was vacuum filtered, washed with dimethylformamide containing 50% water, then with water and dried to recover 635 mg. of 4-fluoro-17α-hydroxy-progesterone. The raw product was purified by dissolution at reflux and recrystallization from methanol. The yield of the purification was of the order of 74%.

The product obtained had a melting point of 212° C. and a specific rotation $[\alpha]_D^{20} = +75.8° \pm 1.5°$ (c.=0.5% in chloroform).

It was soluble in chloroform, slightly soluble in benzene, acetone and methylene chloride, insoluble in water, dilute aqueous acids and alkalis, alcohol, ether and methanol.

*Analysis.*—$C_{21}H_{29}O_3F$, molecular weight=348.44. Calculated: C, 72.38%; H, 8.38%; F, 5.45%. Found: C, 72.1%; H, 8.2%; F, 5.6%.

Ultraviolet spectra: $\lambda_{max.}$ (ethanol) 248–249 mμ, $\epsilon$=15.300.

This compound is not described in the literature.

EXAMPLE V.—PREPARATION OF 4-FLUORO-19-NOR-TESTOSTERONE AND ITS HEXAHYDROBENZOIC ACID ESTER.

By applying the process described in Example IV, 4-fluoro-Δ⁴-19-nor-androstene-17β-ol-3-one (or 4-fluoro-19-nor-testosterone) having a melting point of 148° C. and a specific rotation $[\alpha]_D^{20} = +49° \pm 1°$ (c.=0.5% in chloroform), ultraviolet spectra $\lambda_{max.}$ (ethanol) at 248 mμ, $\epsilon$=15.200 and its hexahydrobenzoic acid ester having a melting point of 144° C. and a specific rotation $[\alpha]_D^{20} = +45° \pm 0.5°$ (c.=0.5% in chloroform) were prepared starting from 19-nor-testosterone and passing through the following intermediates.

*Step A.*—3-N-pyrrolidyl-enamine of 19-nor-testosterone (3-N-pyrrolidyl-Δ³,⁵-19-nor-androstadiene-17β-ol) having a melting point of 135° C. and a specific rotation $[\alpha]_D^{20} = -167.3° \pm 1.5°$ (c.=0.5% in dioxane).

*Step B.*—4 - fluoro - Δ⁵-19-nor-androstene-17β-ol-3-one having a melting point of 171° C. and a specific rotation $[\alpha]_D^{20} = +89° \pm 1°$ (c.=0.5% in chloroform).

The starting compound was prepared according to the method described by Wilds et al., J. Am. Chem. Soc., 75, 5366 (1953). The final esterification was effected by the action of hexahydrobenzoyl chloride in pyridine.

EXAMPLE VI.—PREPARATION OF 4-FLUORO-17α-ACETOXY-PROGESTERONE

By application of the process described in Example IV, 4-fluoro-17α-acetoxy-progesterone having a melting point of 245° C. and a specific rotation $[\alpha]_D^{20} = +53.7° \pm 1°$ (c.=0.5% in chloroform), ultraviolet spectra: $\lambda_{max.}$ (ethanol) 247 mμ $\epsilon$=14,500 was obtained starting from 17α-acetoxy-progesterone and passing through the following intermediates:

*Step A.*—3-N-pyrrolidyl-enamine of 17α-acetoxy-progesterone having a melting point of 249° C. and a specific rotation $[\alpha]_D^{20} = -178° \pm 2°$ (c.=0.5% in dioxane).

*Step B.*—4-fluoro 17α-acetoxy-Δ⁵-pregnene-3,20-dione having a melting point of 230° C. and a specific rotation $[\alpha]_D^{20} = +10.6° \pm 0.5°$ (c.=0.5% in chloroform).

The starting compound was prepared after the method described by Turner, J. Am. Chem. Soc., 75, 3489 (1953).

EXAMPLE VII.—PREPARATION OF 4-FLUORO-Δ⁴-PREGENE-11β,17α-DIOL-3,20-DIONE

Applying the process of Example IV, 4-fluoro-Δ⁴-pregnene-11β,17α-diol-3,20-dione having a melting point of 198° C., a specific rotation $[\alpha]_D^{20} = +103.1° \pm 1.5°$ (c.=0.5% in chloroform) and an ultraviolet spectra: $\lambda_{max.}$ (ethanol) =249 mμ $\epsilon$=14.200 was prepared starting from Δ⁴-pregnene-11β,17α-diol-3,20-dione and passing through the following intermediates:

*Step A.*—3-N-pyrrolidyl-enamine of Δ³,⁵-pregnadiene-11β,17α-diol-20-one having a melting point of 234° C. and a specific rotation $[\alpha]_D^{20} = -88.3°$ (c.=0.5% in dioxane).

*Step B.*—4-fluoro-Δ⁵-pregnene - 11β,17α-diol-3,20-dione having a melting point of 240° C. and a specific rotation $[\alpha]_D^{20} = -54° \pm 1°$ (c.=0.5% in chloroform).

The starting compound was prepared after the method described by Shull et al., J. Am. Chem. Soc., 77, 763 (1955).

EXAMPLE VIII.—PREPARATION OF 4-FLUORO-17α-ETHYNYL-19-NOR-TESTOSTERONE

*Step A.*—10 gm. of 17α-ethynyl-19-nor-testosterone were dissolved in 70 cc. of methanol. The reaction mixture was heated to reflux under a current of nitrogen and 10 cc. of pyrrolidine dissolved in an equal volume of methanol were added over a period of several minutes. The reaction mixture was heated for a period of 5 minutes, then cooled. The 3-(N-pyrrolidyl)-enamine of 17α-ethynyl-19-nor-testosterone formed was vacuum filtered. The product was washed by trituration with petroleum ether and with methanol. The yield was 10.6 gm. of product melting at 165° C. and having a specific rotation $[\alpha]_D^{20} = -255.5° \pm 2°$ (c.=0.5% in dioxane). This product was soluble in alcohol, ether, acetone, benzene, chloroform and dioxane, insoluble in water and dilute aqueous acids or alkalis.

Amount of nitrogen: 3.9%; theoretical being 3.99%.

This compound is not described in the literature.

*Step B.*—15 gm. of the pyrrolidyl-enamine of Step A was introduced into 150 cc. of methanol containing 10% water. The reaction mixture was cooled to −25° C. and perchlorylfluoride was allowed to bubble through a suspension of the enamine. After cessation of the exothermic reaction (3 to 5 minutes), the excess of perchloryl-fluoride was removed by a current of nitrogen. The reaction mixture was poured into a mixture of water and ice, and 4-fluoro-17α-ethynyl-Δ⁵-19-nor-androstene - 17β-ol-3-one was vacuum filtered with a yield of 65%. The product was immediately dissolved in 10 volumes of dimethyl-formamide. One volume of hydrochloric acid was added and the reaction mixture allowed to stand for several minutes at room temperature. Thereafter it was poured on a mixture of water and ice and extracted with methylene chloride. The extracts were washed with water, dried, concentrated to dryness under vacuum and the residue crystallized from isopropyl ether. 4-fluoro-17α-ethynyl-19-nor-testosterone was obtained which was recrystallized from methanol. The melting point was 177° C. and the specific rotation $[\alpha]_D^{20} = -28° \pm 0.5°$ (c.=0.5% in chloroform). The product was soluble in alcohol, ether, acetone and chloroform, slightly soluble in benzene, and insoluble in water.

*Analysis.*—$C_{20}H_{25}O_2F$, molecular weight=316.40. Calculated: C, 75.92%; H, 7.96%; F, 6.00%. Found: C, 76.0%; H, 7.9%; F, 5.9%.

Ultraviolet spectra: $\lambda_{max.}$=247 to 248 m$\mu$ $\epsilon$=15.400.

This compound is not described in the literature.

EXAMPLE IX.—PREPARATION OF 4-FLUORO-17α-ETHYL-19-NOR-TESTOSTERONE

Applying the process of Example VIII, 4-fluoro-17α-ethyl-19-nor-testosterone having a melting point of 139 to 140° C., and a specific rotation $[\alpha]_D^{20} = +20.5° \pm 1°$ (c.=0.5% in chloroform), and ultraviolet spectra: $\lambda_{max.}$ (ethanol) 247 m$\mu$ $\epsilon$=15.400 was prepared starting from 17α-ethyl-19-nor-testosterone by passing through the following intermediates:

Step A.—3-pyrrolidyl-enamine of 17α-ethyl-19-nor-Δ⁴-androstene-17β-ol-3-one and

Step B.—4-fluoro-17α-ethyl-19-nor-Δ⁵-androstene-17β-ol-3-one.

EXAMPLE X.—PREPARATION OF 4-FLUORO-16α-METHYL-Δ⁴-PREGNENE-3,11,20-TRIONE

Applying the process described in Example VIII, 4-fluoro-16α-methyl-Δ⁴-pregnene-3,11,20-trione, melting at 185° C. and then 192° C. and having a specific rotation $[\alpha]_D^{20} = +217° \pm 2°$ (c.=0.5% in dioxane), ultraviolet spectra: $\lambda_{max.}$ (ethanol) 246 m$\mu$ $\epsilon$=14.000 was prepared starting from 16α-methyl-Δ⁴-pregnene-3,11,20-trione by passing through the following intermediates:

Step A.—3-pyrrolidyl-enamine of 16α-methyl-Δ⁴-pregnene-3,11,20-trione and

Step B.—4-fluoro-16α-methyl-Δ⁵-pregnene-3,11,20-trione.

The compounds described in Examples IX and X are new.

The 3-keto-4-fluoro-Δ⁴-steroids of the invention possess protein anabolic activity and are useful for promoting storage of protein and stimulating tissues.

Various modifications of the process and products of the invention may be made without departing from the spirit or scope thereof, and it is to be understood that the invention be limited only as defined in the appended claims.

We claim:

1. A process for the preparation of 3-keto-4-fluoro-Δ⁴-steroids having the formula

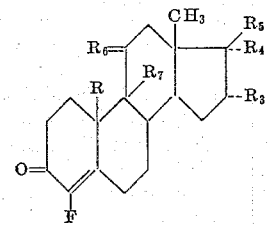

wherein R and R₃ are selected from the group consisting of hydrogen and methyl, R₄ is selected from the group consisting of hydrogen, hydroxy, ethyl, ethynyl and acyloxy wherein the acyl is derived from the organic carboxylic acid having 1 to 7 carbon atoms, R₅ is selected from the group consisting of acetyl, hydroxy and acyloxy wherein the acyl is derived from an organic carboxylic acid having 1 to 7 carbon atoms, R₆ is selected from the group consisting of keto, $$\diagdown\!\!\!\!\diagdown\text{OH} \atop \diagup\!\!\!\!\diagup\text{H}$$

and when taken with R₇ is a double bond and R₇ is hydrogen which comprises reacting a steroid having the formula

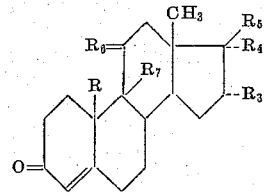

where R, R₃, R₄, R₅, R₆ and R₇ have the above definitions with a secondary amine selected from the group consisting of di-lower alkyl amines, pyrrolidine, piperidine and morpholine in the presence of a lower alkanol to form a 3-enamine of the formula

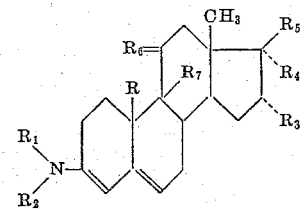

wherein R, R₃, R₄, R₅, R₆ and R₇ have the above definition and

is selected from the group consisting of dilower alkyl amino, pyrrolidyl, piperidyl and morpholino, reacting the latter with perchloryl fluoride in an aqueous polar solvent to form a 3-keto-4-fluoro-Δ⁵-steriod having the formula

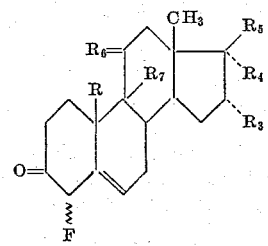

wherein R, R₃, R₄, R₅, R₆ and R₇ have the above definitions, isomerizing the said product under acid conditions to form the corresponding 3-keto-4-fluoro-Δ⁴-steroid and recovering the latter.

2. The process of claim 1 wherein the perchloryl fluoride is reacted in aqueous dimethylformamide.

3. The process of claim 1 wherein the acid in the isomerization step is hydrochloric acid.

4. 4 - fluoro - 16α-methyl-Δ⁴,⁹⁽¹¹⁾-pregnadiene-17α-ol-3,20-dione.

5. 4-fluoro-17α-hydroxy-progesterone.

6. 4-fluoro-17α-acetoxy-progesterone.

7. 4-fluoro-19-nor-testosterone.

8. The hexahydrobenzoic acid ester of 4-fluoro-19-nor-testosterone.

9. 4-fluoro-4-pregnene-11β,17α-diol-3,20-dione.

10. 4-fluoro-17α-ethyl-19-nor-testrosterone.
11. 4-fluoro-16α-methyl-Δ⁴-pregnene-3,11,20-trione.
12. 4 - fluoro - 16α - methyl - $\Delta^{5,9(11)}$-pregnadiene-17α-ol-3,20,-dione.
13. 4-fluoro-$\Delta^5$-pregnene-3,20-dione.
14. 4-fluoro-$\Delta^5$-androstene-17β-ol-3-one.
15. 4-fluoro-$\Delta^5$-pregnene-17α-ol-3,20-dione.
16. 4-fluoro-19-nor-$\Delta^5$-androstene-17β-ol-3-one.
17. 4-fluoro-17α-acetoxy-$\Delta^5$-pregnene-3,20-dione.
18. 4-fluoro-$\Delta^5$-pregnene-11β,17α-diol-3,20-dione.
19. 4-fluoro-17α-ethynyl - 19 - nor-$\Delta^5$-androstene-17β-ol-3-one.
20. 4 - fluoro - 17α - ethyl-19-nor-$\Delta^5$-androstene-17β-ol-3-one.
21. 4-fluoro-16α-methyl-$\Delta^5$-pregnene-3,11,20-trione.
22. 4-fluoro - 17α - acetoxy-16α-methyl-$\Delta^{4,9(11)}$-pregnadiene-3,20-dione.

References Cited by the Examiner

UNITED STATES PATENTS

| | | | |
|---|---|---|---|
| 3,173,914 | 3/1965 | Bowers | 260—239.55 |
| 3,198,792 | 8/1965 | Reerink et al. | 260—239.5 |

OTHER REFERENCES

Nakanishi et al., "Chemistry and Industry," September 3, 1960, page 1136–1137 relied on.

LEWIS GOTTS, *Primary Examiner.*

E. L. ROBERTS, *Assistant Examiner.*